Dec. 23, 1958 G. W. LEWIS 2,865,335
POWER MULTIPLIER
Filed March 11, 1953
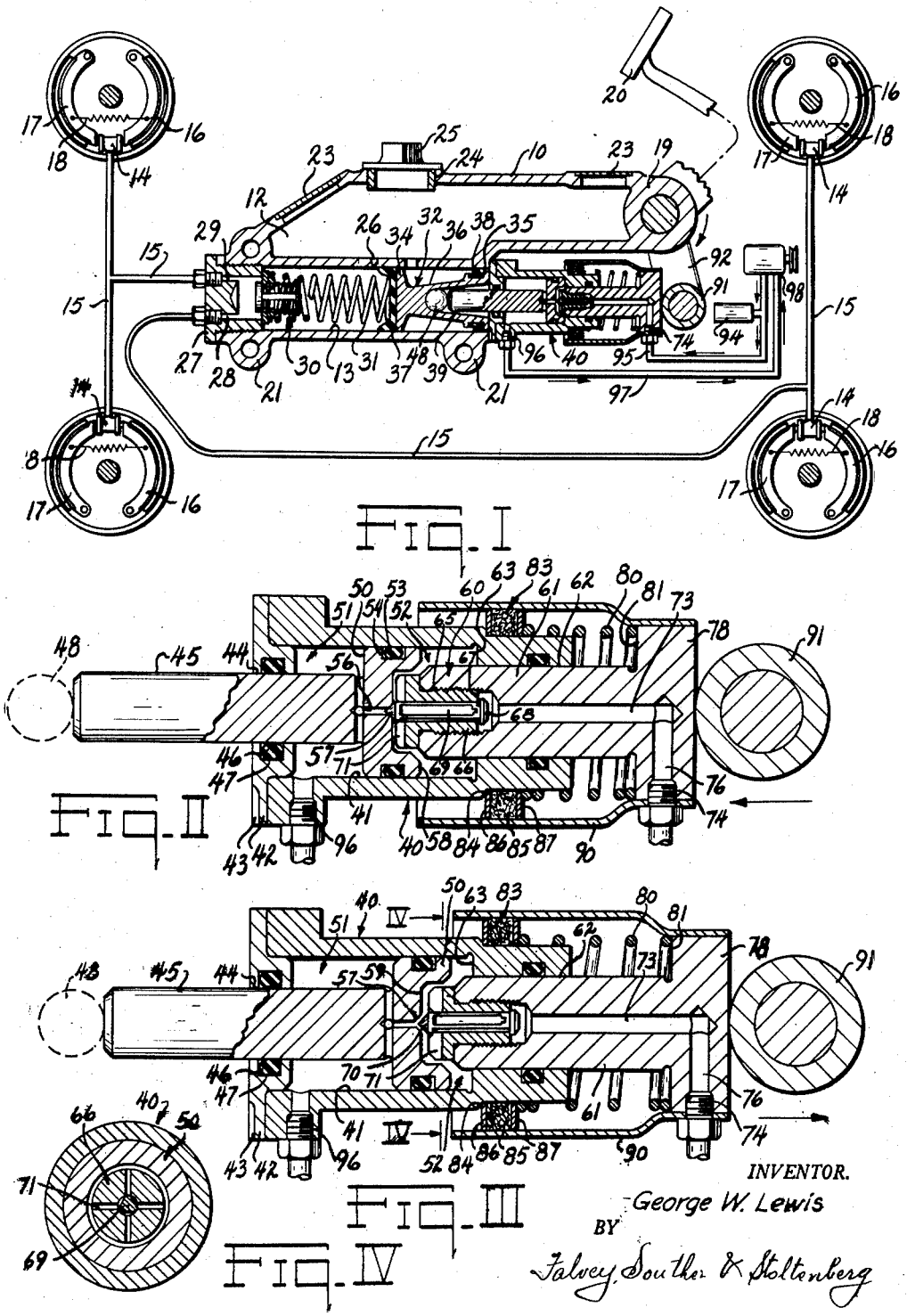
INVENTOR.
George W. Lewis
BY
Falvey, Souther & Stoltenberg

United States Patent Office 2,865,335
Patented Dec. 23, 1958

2,865,335

POWER MULTIPLIER

George W. Lewis, Toledo, Ohio

Application March 11, 1953, Serial No. 341,780

4 Claims. (Cl. 121—41)

This invention relates to a power multiplying system designed to control a substantial amount of power by the manual application of a small amount of power and has particular utility for controlling and operating component parts, such as brakes and other accessories, of automotive vehicles, aircraft etc.

The invention embraces a hydraulic unit for multiplying manual thrust by a predetermined factorial constant to perform work without introducing any appreciable time lag that may interfere with its immediate delivery of power in response to small values or increments of the manual thrust applied.

The invention embodies a power multiplier unit responsive to small gradations for quickly and effectively operating the brakes of automobiles with approximately one-half or one-third of the manual effort required in conventional braking systems.

The invention provides a self-integrated hydraulic unit for augmenting manual thrust designed for ready substitution of the push rod used with the master cylinder in conventional braking systems and thereby functions as a brake booster, the hydraulic unit being arranged so that manual actuation of the brakes is not interfered with in case of failure of the hydraulic pressure.

In the hydraulic brake system art it is customary to call the manually-operated hydraulic pressure-producing element the master cylinder and the power-operated mechanism assisting the manually-operated element the booster. This terminology is maintained in this application for sake of simplification even though the functions and arrangements of these elements differ from the conventional system now used as in the adaptation of the invention to this art, the master cylinder transmits fluid under pressure directly to the brake cylinders and the booster acts on the master cylinder to augment the manual thrust applied by the operator and thereby eases the manual effort exerted. According to the present invention, the reaction for controlling the brake cylinders is proportional to the manual thrust applied by the operator as the booster pressure is inherently in fixed relation to the manual effort. The advantages gained by the arrangement of the invention are, among others, a considerable simplification of the system, compactness of the booster and of the brake control mechanism, as well as the elimination of complex valving. Thus the invention provides a very highly sensitive brake-applying mechanism requiring a relatively small force for its initial instantaneous actuation and which is responsive to small changes or variations of the manual effort exerted by the operator.

According to the foregoing summary of the invention indicating its nature and substance, it is an object to provide a self-contained hydraulic power multiplier which can be used to provide an instantaneous work-performing action of high value in response to a manual force of small magnitude wherein failure of the hydraulic power will not render the work-performing action ineffective but only diminishes its multiplying value.

An object of the invention is to provide a manual effort amplifying system having a quick and positive action for controlling the operation of parts of automotive vehicles which requires, in conventional installations, the application of a high degree of effort by the operator.

Another object of the invention is the provision of a manual effort multiplier servo unit of reduced overall dimensions for a given work capacity, permitting its installation in a relatively small space and adapted for ready substitution in conventional hydraulic installations.

Another object of the invention is to provide control means for a power actuator whereby the operator will "Feel" the pressure applied as the power actuator reacts on the manual control in proportion to the magnitude of the pressure applied.

Another object of the invention is to provide a hydraulic brake system for a motor vehicle including a manual thrust amplifier having rapid response to energizing impulses of low amplitude under the control of the operator obtaining its power from secondary means operable from the prime mover of the vehicle, so arranged that the brake mechanism can be operated effectively and efficiently manually when the power for the secondary means is not available, as, for example, when the prime mover is at rest.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a diagrammatic illustration, partly in section, of an embodiment of the invention showing the parts of the operating mechanism in their unoperated or idle position;

Fig. II is a longitudinal cross-section slightly enlarged showing the parts of the manual power intensifier or booster unit in work-performing position;

Fig. III is a view similar to Fig. II showing the position occupied by the parts of the booster unit when the manual thrust has been released;

Fig. IV is a sectional view taken along lines IV—IV of Fig. III looking in the direction of the arrows.

In the drawings, the invention is shown in its application to a hydraulic brake system for automobiles. However, it is to be understood that the principles of the invention may find physical expression in any hydraulic positioning servo mechanism or system other than the one shown, and it is, therefore, contemplated that the same may be practiced or carried out in different ways in other systems or mechanisms and wherever the same may be found to be of utility.

Referring particularly to Fig. I of the drawings, 10 designates a casing or main body of the master cylinder unit in which are integrally cast at its upper section the fluid storage chamber or reservoir 12 and a cylindrical chamber or barrel 13 at its lower section. The barrel 13 is suitably machined to house the motion-operated means of the master cylinder used for placing a liquid under pressure to be applied to the brake-actuating devices or wheel cylinders 14 by suitable conduits or fluid-carrying means 15 to move the friction members or brake shoes 16 and 17 to the brake-applying position against the action of the resilient means such as the retracting spring 18.

The casing 10 is formed with a laterally extending portion or bracket 19 pivotally supporting the manually operable input or thrust-applying member, such as the brake pedal 20 and is provided with ears or apertured lugs 21, by means of which the casing is suitably attached to the frame-work of the vehicle. The top section of the reservoir 12 is provided with a pair of openings closed by expansion plugs 23 and with a fluid filler opening 24 normally closed by a vented closure or detachable cap 25 providing means for venting the reservoir to the atmosphere. The bottom wall of the reservoir 12 is provided with suitable ports 26 for the flow by gravity of the liquid stored therein to the cylindrical chamber 13 which is closed at its forward end by a centrally recessed threaded member 27 provided with fluid discharge passageways or outlet ports 28 and 29 adapted to receive the detachable coupling means for the conduits 15 connected to the brake moving devices 14 of the hydraulic brake system.

The outlet passageways 28 and 29 of the master cylinder are controlled by a suitable check valve assembly 30 which is retained in position against the member 27 by the piston retracting spring 31. The valve 30 permits the free flow of fluid through the passageways to brake-actuating devices 14 but checks the back flow to the master cylinder unit on the return action. Within the cylindrical barrel 13 is a reciprocable impulser plunger of brake-actuating piston 32, preferably of the spool type, having heads 34 and 35 separated by a reduced portion 36 provided with the usual packing members or sealing cups 37 and 38. The main cup 37 is held in position against the head 34 by the rearward end of the spring 31 and the secondary sealing cup 38 is located in a groove provided adjacent to the inner surface of the piston head 35. The piston 32 is provided with a central recess 39 to receive its input or actuating member which, in conventional installation, takes the form of a push rod controlled by the brake pedal or manual thrust-producing member.

One of the important phases of this invention is the provision of a self-integrated manual power multiplier unit 40 producing an instantaneous work-performing action of high magnitude in response to thrust or manual force of small value so arranged as to inherently provide a proportional "Feel" at the manual control and which will not render its work-performing action ineffective when the hydraulic pressure is not available. The liquid pressurized power unit 40 of the invention in the brake system shown in Fig. I acts as a manual thrust multiplier for the master cylinder unit 10 and is designed for ready substitution of the push rod connected to the brake pedal for imparting movement to the motion-operated means of the master cylinder unit in conventional brake installations and, therefore, performs the function of a brake booster. The booster unit 40 as shown includes a power cylinder body having an axial bore 41 closed at one end by a flanged member 42 accommodating suitable means for securing the unit to the master cylinder closing the rear end of the barrel 13 venting the same to the atmosphere by recess 43.

The closure member 42 of the booster unit is formed with an aperture 44 for the passage of a reciprocable output plunger or work-performing member 45 which extends exteriorly thereof and is dimensioned to loosely fit the recess 39 of the master piston 32. A fluid-tight sliding connection is provided between the aperture 44 and member 45 in the form of a sealing member 46, preferably of the O-ring type, capable of slight movement in the groove 47 formed on the transverse wall of said aperture. In order to facilitate the ready substitution for the push rod used in conventional brake installations, and secure a rapid axial alignment of the actuator unit with the master cylinder piston 32, compensating for tolerances of manufacture, suitable alignment means are provided which may take the form of a ball 48 interposed between the end of the output member 45 and the recess 39 of the piston 32.

The plunger 45 is actuated by a displaceable member movable when subjected to pressure differential obtained by a pressurized liquid supplied to the power cylinder and such displaceable member is herein shown as a reciprocable piston 50 dividing the cylindrical bore 41 into opposed spaces or fluid chambers 51 and 52. The piston 50 has a sliding fit within the bore 41 and is provided with a fluid-tight sliding connection therewith by having its outer periphery surrounded by a resilient sealing member preferably in the form of an O ring 53 dimensioned to provide a slight clearance with the side walls of the rectangularly-shaped peripheral groove 54. The displaceable member 50, which is shown as integrally formed at one end of the plunger 45 is transversed by a passageway 56 for flow of liquid from the working space 52 to the opposed space 51. A valve seat 57 is formed at the liquid inflow end of the passageway 56 on the active side 58 of the piston substantially at its central axis. The active side 58 of the piston 50 is formed with a depressed centrally-disposed circular portion 59 adapted to receive and be engaged by a thrust-applying member 60 which forms a secondary piston assembly operatively disposed within the work-performing space or chamber 52 of the booster unit.

The thrust-applying member which forms the secondary piston assembly, generally designated as 60, includes a reciprocable plunger 61 having its forward end projecting within the cylinder of the manual power intensifier 40 through an opening 62 piercing the transverse wall at the rear end of the bore 41 forming a shoulder 63 which limits the rearward movement of the displaceable member 50. A fluid-tight sliding seal between the plunger 61 and the aperture 62 is obtained by the use of a distortable member of the O-ring type loosely positioned within the rectangularly-shaped groove formed on the transverse wall of the opening 62.

The forward end of the plunger 61 carries valve means for controlling the application of the pressurized liquid to the working space 51 and is thereby provided with a threaded aperture 65 closed by a valve unit forming a detachable assembly which comprises a hollow valve guiding member 66 threaded thereon having at its rear end a uniplanar inlet valve seat 67 adapted to be closed by the flanged valve head 68 formed at the rearward end of the valve stem or body 69. The valve stem 69 is triangular in cross-section to provide means for suitably centernig the valve head 68 reducing its contacting area with the guide member 66 enhancing the freedom of movement therein and, at the same time, permitting the passage of fluid past the valve stem when the valve head is in open position. The forward portion of the valve stem 69 projects beyond the guide member and forms a conical end section or valve-closing element 70 adapted to engage the valve seat 57 located on the active side 58 of the booster piston 50 to seal off the pressurized liquid from the chamber 51. The vertically disposed surface of the guide member 66 is formed with a plurality of transverse channels 71 to facilitate the flow of the pressurized liquid to the working space 52 of the booster unit. The threaded opening 65 of the plunger 61 is in liquid communication with a longitudinal bore on conduit 73 which is in direct communication with the inlet fitting 74 by the transverse liquid passageway 76 formed at the enlarged end portion 78 of the plunger 61.

The valve means of the invention are normally biased to closed position through the engagement of the valve head 68 with the valve seat 67 by the presence of pressurized liquid in the conduit means or passageways provided in the plunger 61 whenever the conical projecting portion or valve-closing element 70 is out of engagement with the valve seat 57, and are so dimensioned and arranged that the pressurized liquid will enhance sealing action of the valve element 70 with the valve seat 57 when the same are brought into engagement to unseat the valve head 68.

In the embodiment shown, suitable means exterior of the cylinder housing are provided for holding apart the main and secondary pistons, retaining the plunger 61 in its retracted or idle position and thereby avoiding the accidental application of pressurized liquid to the working space 52. Such means are shown in the form of an exteriorly positioned resilient member or coil spring 80 having one end abutting the vertically disposed surface 81 of the enlarged portion of the plunger 61 and its other end abutting the stationary sealing assembly 83 held against the shoulder 84 formed on the outer surface of the cylinder housing. The sealing assembly 83 comprises the gasket 85 confined within the annular washers 86 and 87 to provide a dust-proof seal with the enclosing sleeve 90 which, in turn, is fixedly secured to the periphery of the enlarged portion 78 of the thrust-applying plunger 61. The sleeve 90 and sealing assembly 83 provide effective means to prevent the ingress and deposition of dust and foreign matter on the operating parts of the actuator, particularly the plunger 61.

The rear surface of the enlarged portion 78 of the thrust-applying plunger 61 is in direct engagement with an offset roller 91 carried at the end of the depending member 92 actuated by the manual control or operating brake pedal 20 so the plunger 61 and the secondary piston 60 and valve assembly are under the control of the operator of the vehicle.

In the form shown, the pressurized liquid for operating the booster unit 40 is obtained by a suitable hydraulic power unit or pump 93 driven by the vehicle prime mover not shown which places liquid under pressure by suitable valves into a storage reservoir or accumulator 94 having its pressure side connected by suitable hydraulic line 95 to the inlet fitting 74 and receives the liquid discharged from the fluid space 51 through the outlet port fitting 96 by means of suitable hydraulic line 97 connected to its low pressure side inlet port 98.

The operation of the embodiment of the invention having the brake system supplied with fluid and the hydraulic power source operating to supply pressurized fluid to the booster unit can be summarized as follows:

Assuming the parts in their unoperated position, as shown in Fig. I, upon the application of manual thrust to the brake pedal 20 by the vehicle operator, the plunger 61 will be moved forwardly by the offset roller 91 carried by the depending member 92 of the brake pedal. The forward movement of the plunger 61 will bodily move the secondary piston 60 and valve unit towards the booster piston 50 against the action of spring 80 causing the conical end section or valve-closing element 70 to engage the valve seat 57 and instantly seal off the passageway 56 to permit a pressure differential to be established between the chambers 51 and 52. The engagement of the valve-closing member 70 with the valve seat 57 will unseat the valve head 68 from the inlet valve seat 67 and thereby permit fluid under pressure from the hydraulic power source in passageway 73 to pass the valve head 68 and flow through the guide member 66 and transverse channels 71 to the chamber 52 and thereby supply displacement fluid under pressure to move the booster piston 50 discharging through the outlet 96 the fluid in chamber 51, the parts of the booster unit taking the position shown in Fig. II.

The forward movement of the piston 50 under power is instantaneous as the application of the pressurized fluid to the working space 52 automatically multiplies by a predetermined factor depending upon the relative areas of the main and secondary pistons, the manual thrust applied by the secondary piston 60 in the working space 52 and thereby move under such amplified force the output member 45 to instantly actuate the piston 32 placing the liquid in the master cylinder 13 under pressure and applying the same to the wheel motors 14 to move the brake shoes 16 and 17 to brake-applying position.

It should be noted that the pressurized fluid in the working space or chamber 52 exerts a reaction force on the secondary piston 60 in a direction opposite to the manual thrust exerted thereon by the brake pedal 20. This reaction force is transmitted directly to the brake pedal and thereby to the operator's foot whereby the operator will "feel" the actuation of the booster unit and become fully aware of any changes during its working-performing action.

In the embodiment shown it can be seen that the diameter of the secondary piston 60 constituting the end of plunger 61 is smaller than the diameter of the main piston 50, so that an advantage corresponding to a predetermined multiplying factor is provided therebetween which is proportional to the differential between their respective areas. The reaction force due to this multiplying factor provides a proportional "Feel" which enables the operator to maintain a very sensitive control over the hydraulic operation of the power actuator 40 even though a fluid under high super atmospheric pressure is supplied thereto. In carrying the invention into practice in its application to brake systems for passenger vehicles, it has been found that a ratio ranging between 1:2 to 1:3 of the area of the secondary piston to the main piston area is satisfactory to give an effective multiplying factor and provide a proportional "Feel" corresponding to a reaction force of one-half to one-third of the amplified force of booster piston 50 by the pressurized liquid, so that the brakes can be effectively applied with approximately one-half to one-third of the manual effort required by the operator in conventional braking systems.

It is to be noted that after the admission of the pressurized fluid to the working space 52 and the sealing off of passage 56 to move the booster piston 50 occurs by the actuation of the valve means, the multiplying action of the actuator unit 40 will automatically take place and the resultant working force of the output member will be directly proportional to the manual thrust exerted. It is, therefore, apparent that in accordance with the invention, the extent of movement of the main piston 50 is a function of the extent of movement of the valve means, so that a positive indication of the position and extent of movement of the output member 45 can be easily ascertained upon examination of the position of the manual control.

As soon as the operator discontinues the thrust applied or releases the brake pedal 20 to release the vehicle brakes, the plunger 61 forming the secondary piston 60 moves rearwardly with respect to the booster piston 50 under the combined action of the resilient member 80 and the reactive force of the pressurized liquid in the working space 52. The rearward movement of the plunger 61 will unseat the valve-closing element 70 from the valve seat 57 and concurrently move the enlarged valve head 68 into engagement with the inlet valve 67 sealing the passage of the pressurized fluid to the working space 52 under the action of the pressurized liquid in the conduit 73. Immediately upon the concurrent motion of the valve body 69 with respect to the plunger 61, the fluid from the chamber 52 flows through the passageway 56 to the chamber 51 and is discharged by the outlet passage 96 to the inlet port 98 of the power-driven pump 93. The booster piston 50 is returned to its idle or inoperative position by the application to the output member of the force produced by the combined action of the spring 31 and of the hydraulic fluid returned to the master cylinder 13 by the force of retracting springs 18 normally urging the friction brake shoes 16 and 17 to the non-brake-applying position thereby releasing the vehicle brakes.

One of the important features contemplated by the invention resides in the fact that the actuator or multiplier unit 40 will operate irrespective of the application of pressurized liquid by directly transmitting the manual force applied thereto. In case of failure of the hydraulic pressure, the forward end of the plunger 61 constituting the secondary piston 60 directly contacts the active side 58 of the main piston 50 and thereby forms a direct mechanical link to transmit to the output member 45 any manual force applied to the plunger 61. It should be noted, therefore, that in the hydraulic brake system shown, failure of the hydraulic pressure to the multiplying unit 40 will not interfere with the application of the brakes as in such case the multiplying unit acts as the conventional push rod, of which the same is a substitute.

Examination of Fig. I of the drawings clearly indicates that in case of failure of the hydraulic pressure, manual actuation of the brakes can be successfully carried out because in such case the forward end of the plunger 61 constituting the secondary piston 60 directly contacts the active side 58 of the main piston 50, and thereby transmits the manual thrust exerted on the plunger 61 by the operator on the brake pedal 20, and thereby moves the output member 45 towards its work-performing position. The movement of the output member 45 is transmitted to the piston 32 of the master cylinder whereby the fluid in the cylinder 13 and in the hydraulic lines connected to the motors 14 is placed under pressure and thereby causes the actuation of the friction shoes 16 and 17 against retracting spring 18 to brake-applying position. The release of the brake pedal 20 by the operator will move the parts to their idle or unoperated position under the combined action of retractable spring 18, master cylinder retracting spring 31, as well as the actuator spring 80.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. A liquid pressure activated force amplifying unit comprising a cylinder, a main piston reciprocable in said cylinder dividing the same into opposed main and secondary liquid containing chambers, a discharge outlet port located adjacent to one end of said cylinder, a work-performing member directly connected to said main piston extending exteriorly of said secondary chamber, a smaller piston facing said main piston in said main chamber being reciprocable in one end of said cylinder, the smaller piston having a portion external of said main chamber pierced longitudinally by a fluid passage, the high pressure inlet port carried by an external portion of the smaller piston movable therewith for the inflow of pressurized liquid to the main chamber, a passageway transversing said main piston for establishing liquid communication between the main and secondary chambers, single seals for said main piston and said smaller piston, each single seal providing a sealing action responsive to the intermittent and variable liquid pressure on the main chamber whereby sealing friction in opposition to small initiating forces applied to the secondary piston is materially reduced, dual valve means located at one end of said fluid conduit co-acting with said main piston passageway for controlling the inflow of pressurized liquid to the main chamber and its discharge therefrom, said dual valve means acting upon the application of force to said smaller piston to seal the passageway in said main piston while allowing the inflow of pressurized fluid to the said main chamber thereby amplifying any moving force applied to the smaller piston to the main piston, said dual valve member acting on the release of force applied to said smaller piston to open the passageway of said main piston permitting liquid in the main chamber to be transferred to said secondary chamber and be discharged by its outlet port whereby the main piston closely follows the motions of the smaller piston with minimum lag due to seal friction, and the smaller piston being constructed and arranged to abut the main piston and directly transmit force and motion thereto should the pressure means be inactive.

2. A liquid pressure power unit comprising a cylinder, a closure for one end of said cylinder, a main piston in said cylinder having at one end a work-performing member projecting through said closure and slidable thereon to work-performing position, a smaller piston means operatively disposed within said cylinder with a portion projecting from its other end, resilient means located exteriorly of said cylinder acting on the projecting portion of the smaller piston for holding said pistons apart, thrust operable means external of said cylinder acting on the projecting portion of the smaller piston for sliding the smaller piston means toward said main piston against the action of said resilient means, the smaller piston longitudinally pierced by conduit means, a high pressure inlet directly connected to one end of the conduit means of said smaller piston means and movable therewith for conveying pressurized liquid to said cylinder, a dual valve means located at the other end of the conduit means of the smaller piston means normally urged to closed position by the pressurized fluid in said conduit to shut off the inflow of pressurized liquid to said main chamber, said dual means movable to open position by the actuation of said thrust operable means causing the pressurized liquid to act in opposite directions upon said pistons and thereby intensify the thrust applied to the smaller piston in proportion to the differential between the respective areas of said pistons, separate single seals for the work-performing member and for said smaller piston, each single seal providing sealing action responsive to the intermittent and variable pressures of the cylinder whereby sealing friction in opposition to small initiating forces on the smaller piston means in the inward and outward directions is materially reduced whereby the main piston closely follows the motions of said smaller piston means with a minimum of time lag due to seal friction, and the said smaller piston means being operable for abutting engagement with the main piston to directly transmit force and motion thereto should the source of pressurized liquid be inactive.

3. A liquid pressure power unit comprising a cylinder providing a main chamber, a main piston in said cylinder having a work-performing member projecting from one end of said cylinder to the exterior thereof, a second piston means operatively disposed in the main chamber of the cylinder with a portion projecting to the exterior at the other end of the cylinder, thrust operable means external of said cylinder acting on the exterior portion of said second piston means for moving the second piston means toward said main piston, conduit means longitudinally transversing the second piston means the high pressure inlet port directly connected to conduit means of said second piston means and movable therewith for conveying pressurized liquid to said cylinder, combined valve seat and hollow guide means mounted on the second piston means at the discharge end of said conduit means, a valve member in said hollow guide normally biased into engagement with said valve seat by the pressurized liquid in the said conduit means for sealing off the supply of pressurized liquid to said cylinder, said valve member movable to open position by its engagement with the main piston in response to the actuation of said thrust operable means causing the pressurized liquid to act in opposite directions upon said pistons and thereby intensify the thrust applied to the second piston in proportion to the differential between the respective areas of said pistons, single sealing means for the second piston means carried by said cylinder, the sealing action of said sealing means being responsive to the intermittent and variable liquid pressures of the main chamber whereby their sealing friction is substantially reduced to small initiating forces applied to the secondary piston means whereby the main piston closely follows the motions of the second piston means with minimum time lag due to seal friction, and the second piston means being constructed and arranged to abut the main piston and directly transmit force and motion thereto should the source of pressurized liquid be inactive.

4. A liquid pressure activated force amplifying unit comprising a cylinder, a main piston reciprocable in the cylinder dividing the same into opposed main and secondary chambers, a discharge outlet port located adjacent to one end of the secondary chamber, a work-performing member directly connected to said main piston transversing said secondary chamber and extending exteriorly of one end of said cylinder, a smaller secondary piston having sliding movement at the other end of the cylinder with its forward section transversing the main chamber and with a portion extending exteriorly thereof, the smaller piston longitudinally pierced by a fluid conduit, a high pressure inlet port carried by the external portion of said smaller piston movable therewith for the inflow of pressurized liquid to the main chamber, a passageway transversing said main piston for establishing liquid communication between the main and secondary chambers, separate single seals for said work-performing member and for each of said pistons, each seal providing a sealing action responsive to the intermittent and variable liquid pressure within said cylinder whereby sealing friction in opposition to small initiating forces applied to the secondary piston is materially reduced, dual valve means located at one end of said fluid conduit co-acting with said main piston passageway for controlling the inflow of pressurized liquid to the main chamber and its discharge therefrom, said dual valve means acting upon the application of force to said secondary piston to seal the passageway in said main piston while allowing the inflow of pressurized fluid to the said main chamber thereby amplifying any moving force imposed on the secondary piston to the main piston, said dual valve member acting upon the release of force applied to said secondary piston to open the passageway of said main piston permitting liquid in the main chamber to be transferred to said secondary chamber and discharged by its outlet port whereby the main piston closely follows the motions of the secondary piston with minimum time lag due to seal friction, and the secondary piston being constructed and arranged to abut the main piston and directly transmit force and motion thereto should the pressure means be inactive.

References Cited in the file of this patent

UNITED STATES PATENTS

| | | |
|---|---|---|
| 1,831,737 | Broussouse | Nov. 10, 1931 |
| 2,185,449 | Veenschoten | Jan. 2, 1940 |
| 2,229,247 | Kamenarovic | Jan. 21, 1941 |
| 2,318,756 | Chouings | May 11, 1943 |
| 2,457,721 | Price | Dec. 28, 1948 |
| 2,482,291 | Rush | Sept. 20, 1949 |
| 2,544,042 | Pontius | Mar. 6, 1951 |

FOREIGN PATENTS

| | | |
|---|---|---|
| 747,273 | France | Mar. 28, 1933 |